United States Patent
Kim et al.

(10) Patent No.: US 11,570,516 B2
(45) Date of Patent: Jan. 31, 2023

(54) DISPLAY APPARATUS AND CONTROL METHOD THEREOF

(71) Applicant: SAMSUNG ELECTRONICS CO., LTD., Suwon-si (KR)

(72) Inventors: Minjun Kim, Suwon-si (KR); Daehyun Kim, Suwon-si (KR); Hayeon Yoo, Suwon-si (KR); Sanghee Lee, Suwon-si (KR); Manchul Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/973,938

(22) PCT Filed: Apr. 19, 2019

(86) PCT No.: PCT/KR2019/004744
§ 371 (c)(1),
(2) Date: Dec. 10, 2020

(87) PCT Pub. No.: WO2019/240369
PCT Pub. Date: Dec. 19, 2019

(65) Prior Publication Data
US 2021/0250651 A1 Aug. 12, 2021

(30) Foreign Application Priority Data
Jun. 15, 2018 (KR) .......................... 10-2018-0068534

(51) Int. Cl.
*H04N 21/45* (2011.01)
*H04N 21/466* (2011.01)

(52) U.S. Cl.
CPC ..... *H04N 21/4667* (2013.01); *H04N 21/4532* (2013.01); *H04N 21/4668* (2013.01)

(58) Field of Classification Search
None
See application file for complete search history.

(56) References Cited

U.S. PATENT DOCUMENTS 9,414,108 B2   8/2016   Sirpal et al.
9,648,390 B2   5/2017   Perez
(Continued)

FOREIGN PATENT DOCUMENTS

JP   2017-184066   10/2017
KR   10-0872708    12/2008
(Continued)

OTHER PUBLICATIONS

International Search Report for PCT/KR2019/004744 dated Aug. 19, 2019, 4 pages.
(Continued)

*Primary Examiner* — Jefferey F Harold
*Assistant Examiner* — Charles N Hicks
(74) *Attorney, Agent, or Firm* — Nixon & Vanderhye, P.C.

(57) ABSTRACT

Disclosed is a display apparatus comprising: a display; a user input unit; and a processor configured to identify a user's viewing time based on a user's viewing history, create a list of content to be provided within the identified viewing time based on the viewing history and display the created content list on the display, and select at least one piece of content in the content list for viewing schedule based on a user input through the user input unit.

13 Claims, 22 Drawing Sheets

(56) References Cited

U.S. PATENT DOCUMENTS

| | | |
|---|---|---|
| 2009/0177376 A1 | 7/2009 | Mo et al. |
| 2014/0059615 A1 | 2/2014 | Sirpal et al. |
| 2014/0082645 A1* | 3/2014 | Stern ............... H04N 21/44222 |
| | | 725/13 |
| 2015/0121431 A1* | 4/2015 | Jacoby .................. H04N 21/47 |
| | | 725/59 |
| 2016/0088365 A1* | 3/2016 | Yabu ................. H04N 21/4316 |
| | | 725/14 |
| 2016/0212490 A1 | 7/2016 | Perez |
| 2016/0232215 A1* | 8/2016 | Mochizuki ........... G06F 16/345 |
| 2018/0188054 A1* | 7/2018 | Kennedy ........... G01C 21/3697 |

FOREIGN PATENT DOCUMENTS

| | | |
|---|---|---|
| KR | 10-2009-0075495 | 7/2009 |
| KR | 10-2011-0023496 | 3/2011 |
| KR | 10-2012-0090525 | 8/2012 |
| KR | 10-2015-0111095 | 10/2015 |
| KR | 10-2017-0107873 | 9/2017 |

OTHER PUBLICATIONS

Written Opinion of the ISA for PCT/KR2019/004744 dated Aug. 19, 2019, 5 pages.
Office Action dated Nov. 28, 2022 in KR Application No. 10-2018-0068534 and partial English-language translation.

* cited by examiner

FIG. 20
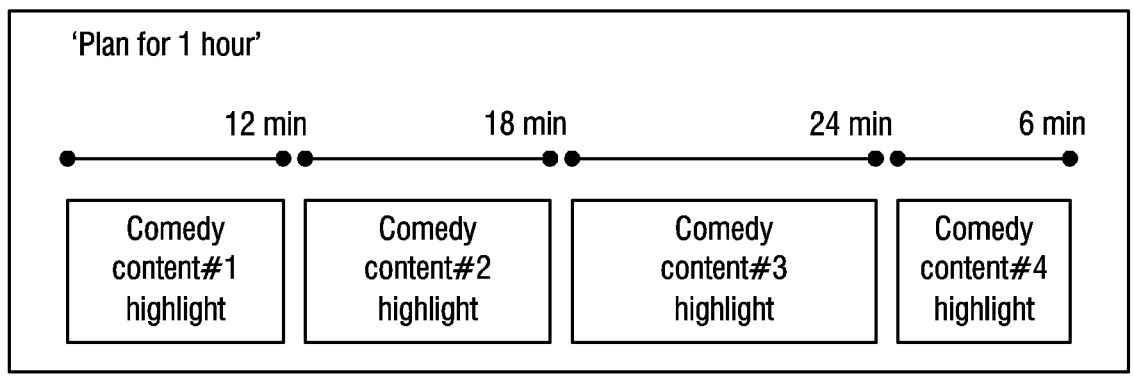

FIG. 22
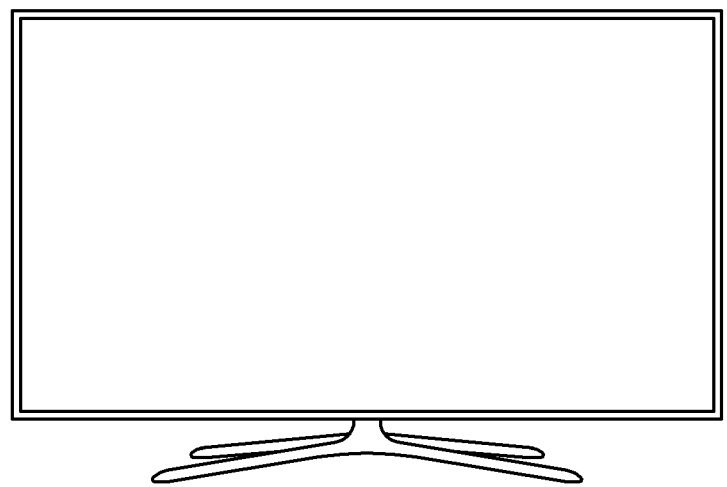

DISPLAY APPARATUS AND CONTROL METHOD THEREOF

This application is the U.S. national phase of International Application No. PCT/KR2019/004744 filed Apr. 19, 2019 which designated the U.S. and claims priority to KR Patent Application No. 10-2018-0068534 filed Jun. 15, 2018, the entire contents of each of which are hereby incorporated by reference.

FIELD

The disclosure relates to a display apparatus and a control method thereof, and more particularly to a display apparatus, which recommends content to a user, and a control method thereof.

DESCRIPTION OF RELATED ART

Recently, content recommendation technology has been actively used. For example, when a user of a TV wants to watch image content, the TV recommends a list of pieces of content that may suit the user's preferences or tastes, with reference to a list of pieces of content a user has watched before or with reference to lists of pieces of content of other users who watched content similar to the image content.

However, a user, who uses conventional recommendation technology, ultimately views one piece of content on the recommendation. Although a content list including a plurality of pieces of content is recommended, a user ultimately selects and views one piece of content among them. Eventually, there is no change in that one piece of content is viewed with regard to a single recommendation, even though an operation of viewing the corresponding content and then viewing another recommended content is repeated.

Like this, the conventional recommendation technology is merely to consequently recommend one piece of content, but not provide a function of recommending a series of content in the form of a package and a function of providing a well-organized viewing plan itself to a user through the recommendation.

SUMMARY

Accordingly, an aspect of the disclosure is to provide a display apparatus which provides a viewing plan to a user by recommending a series of content in the form of a package.

According to an embodiment of the disclosure, there is provided a display apparatus comprising: a display; a user input unit; and a processor configured to identify a user's viewing time based on a user's viewing history, create a list of content to be provided within the identified viewing time based on the viewing history and display the created content list on the display, and select at least one piece of content in the content list for viewing schedule based on a user input through the user input unit.

The processor may be configured to create the content list by a method of identifying first content and then identifying second content based on at least one of a correlation with the first content, a playback end time of the first content, or a remaining viewing time.

The processor may be configured to display a plurality of content lists to be selectable, and select at least one piece of content in the selected content list for viewing schedule based on a user input through the user input unit.

The processor may be configured to create a content list by replacing some pieces of content with other pieces of content, based on a user input making a request for changing the some pieces of content in the displayed content list.

The processor may be configured to create the content list based on a condition input by a user through the user input unit.

The processor may be configured to draw a user's average viewing time per content from a user's viewing history, and create the content list based on the drawn average viewing time.

The processor may be configured to detect a plurality of users using the display apparatus, and create the content list based on information about the plurality of detected users.

The processor may be configured to draw an actual playback time by subtracting a playback time of appended information from a content playback time, and create the content list based on the drawn actual playback time.

According to an embodiment of the disclosure, there is provided a method of controlling a display apparatus, comprising: identifying a user's viewing time based on a user's viewing history; creating and displaying a list of content to be provided within the identified viewing time based on the viewing history; and selecting at least one piece of content in the content list for viewing schedule based on a user input.

The creating and displaying the content list may comprise creating the content list by a method of identifying first content and then identifying second content based on at least one of a correlation with the first content, a playback end time of the first content, or a remaining viewing time.

The selecting may comprise displaying a plurality of content lists to be selectable, and selecting at least one piece of content in the selected content list for viewing schedule based on a user input.

The method may further comprise creating a content list by replacing some pieces of content with other pieces of content, based on a user input making a request for changing the some pieces of content in the displayed content list.

The creating and displaying the content list may comprise creating the content list based on a condition input by a user.

The creating and displaying the content list may include drawing a user's average viewing time per content from a user's viewing history, and creating the content list based on the drawn average viewing time.

The creating and displaying the content list may include detecting a plurality of users using the display apparatus, and creating the content list based on information about the plurality of detected users.

The creating and displaying the content list may include drawing an actual playback time by subtracting a playback time of appended information from a content playback time, and creating the content list based on the drawn actual playback time.

According to an embodiment of the disclosure, there is provided a computer program stored in a medium to carry out the method according to any one of claims 9 to 13 as combined to a display apparatus.

According to an embodiment of the disclosure, there is provided a server comprising: a processor configured to identify a user's viewing time based on a user's viewing history, create a list of content to be provided within the identified viewing time based on the viewing history, and transmit the created content list to the display apparatus.

According to an embodiment of the disclosure, there is provided a computer program stored in a medium to carry out the foregoing control method as combined to a display apparatus.

The computer program may be stored in a medium of a server and downloaded in the display apparatus through a network.

According to an embodiment of the disclosure, a server identifies a user's viewing time based on a user's viewing history, and creates a list of content to be provided within the identified viewing time based on the viewing history, and transmit the created content list to a display apparatus.

According to an embodiment of the disclosure, a method of controlling a server includes identifying a user's viewing time based on a user's viewing history; creating and displaying a list of content to be provided within the viewing time identified based on the viewing history; and transmitting the content list to a display apparatus.

As described above, according to the disclosure, a user can easily view a series of content that suits the user's tastes without any separate control because it is enough that the user plays back a recommended viewing plan in which a series of content is given in the form of a package.

BRIEF DESCRIPTION OF THE DRAWINGS

FIGS. 19 to 20 illustrates operations of a display apparatus according to other embodiments of the disclosure, FIG. 22 illustrates an operation of a display apparatus according to yet another embodiment of the disclosure.

DETAILED DESCRIPTION OF EXAMPLE EMBODIMENTS

Figure 1:
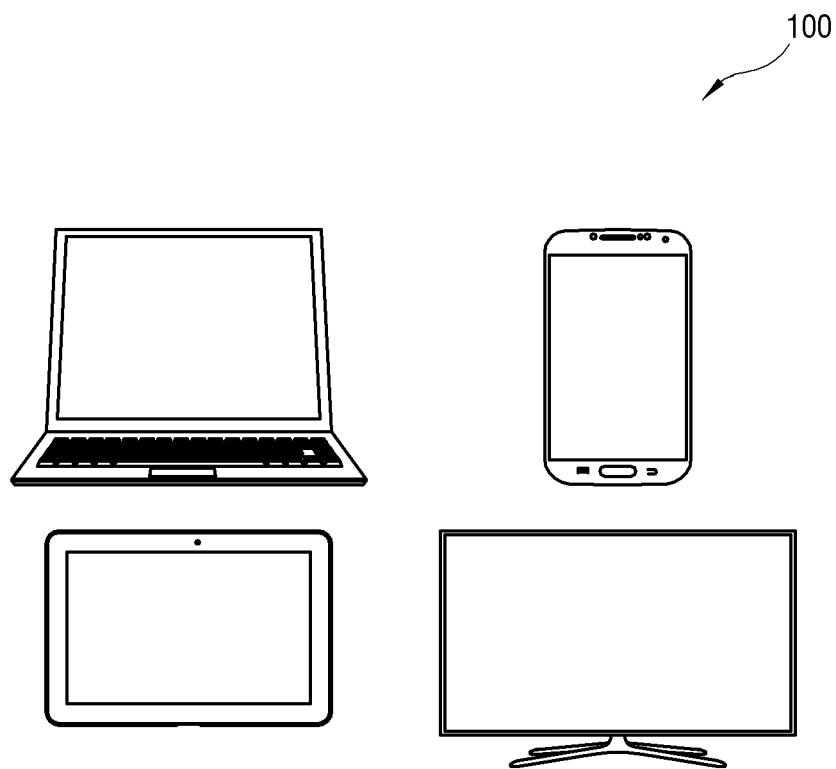
FIG. 1 illustrates a display apparatus according to an embodiment of the disclosure.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present inventive concept and the key configurations and functions. In the following descriptions, details about publicly known functions or features will be omitted if it is determined that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or combination of hardware and software, and be modularized into at least one processor. Further, in the following exemplary embodiments, at least one among a plurality of elements refer to not only all of the plurality of elements but also each element among the plurality of elements excluding the other elements or a combination thereof. Further, the expression of "configured to (or set to)" may for example be replaced with "suitable for," "having the capacity to," "designed to," "adapted to," "made to," or "capable of" according to circumstances. Also, the expression of "configured to (or set to)" may not necessarily refer to only "specifically designed to" in terms of hardware. Instead, the "device configured to" may refer to "capable of" along with other devices or parts in a certain circumstance. For example, the phrase of "the processor configured to perform A, B, and C" may refer to a dedicated processor (e.g. an embedded processor) for performing the corresponding operations, or a generic-purpose processor (e.g. a central processing unit (CPU) or an application processor) for performing the corresponding operations by executing one or more software programs stored in a memory device.

FIG. 1 illustrates a display apparatus 100 according to an embodiment of the disclosure. The display apparatus 100 according to an embodiment of the disclosure may for example be embodied by a television (TV). Further, the display apparatus 100 according to another embodiment of the disclosure may for example be embodied by a laptop computer, a smartphone, a tablet computer, a mobile phone, an electronic frame, a digital billboard, a large format display (LFD), a digital signage, a smartwatch, a head-mounted display or the like wearable device, a computer, a multimedia player, a set-top box, a refrigerator, or the like apparatus capable of outputting an image based content. However, the display apparatus 100 according to an embodiment of the disclosure is not limited to these examples, but may include any apparatus capable of displaying an image.

Figure 2:
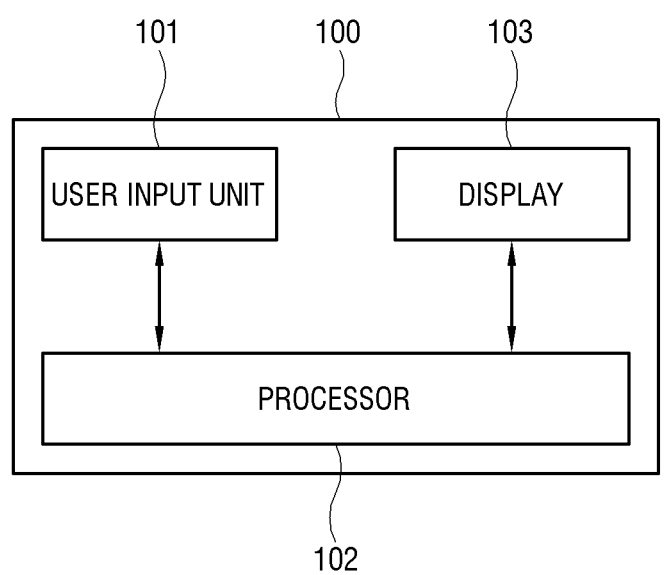
FIG. 2 is a block diagram showing a display apparatus according to an embodiment of the disclosure.

FIG. 2 is a block diagram of a display apparatus 100 according to an embodiment of the disclosure. The display apparatus 100 according to an embodiment of the disclosure includes a user input unit 101, a processor 102, and a display 103. However, the configuration of the display apparatus 100 shown in FIG. 2 is merely an example, and the display apparatus 100 according to an embodiment of the disclosure may be embodied to have another configuration. In other words, the display apparatus 100 according to an embodiment of the disclosure may be embodied including other elements in addition to the elements shown in FIG. 2, or excluding some elements shown in FIG. 2. According to an embodiment of the disclosure, the configurations may include at least one of hardware and/or software, and may be embodied by a circuit or a chip.

The user input unit 101 may receive a user's touch input or a user's remote input using a remote controller, and transmit the corresponding input to the processor 102. Further, the user input unit 101 may receive a voice input uttered by a user and transmit a voice signal based on the voice input to the processor 102. In this case, the user input unit 101 may for example be embodied by a microphone. The user input unit 101 may autonomously perform a signal process with regard to the received voice signal. However, the user input receivable in the user input unit 101 is not limited to these, but a user input based on motion recognition or the like may for example be received.

The processor 102 may process a signal received in the user input unit 101 or perform a predetermined process corresponding to the received signal. For example, the processor 102 may perform a process of content recommendation in response to a signal based on a user input. The processor 102 may be embodied by one or more hardware and/or software modules or combination thereof to perform the foregoing process.

The processor 102 may process an image read from a storage or received from the external apparatus. There are no limits to the kinds of image processing processes to be performed by the processor 102. The image processing performed in the processor 102 may for example include de-multiplexing to dividing an input stream into sub streams such as video, audio and appended data, decoding corresponding to an image format of an image stream, de-interlacing to convert an interlaced-type image stream into a progressive-type one, scaling to adjust an image stream to have a preset resolution, noise reduction to improve image quality, detail enhancement, frame refresh rate conversion, etc.

The processor 102 may perform control to operate general elements of the display apparatus 100. The processor 102 may include a control program (or instruction) to perform such control operation, a nonvolatile memory in which the control program is installed, a volatile memory to which at least a part of the installed control program is loaded, and at least one processor or central processing unit (CPU) that executes the loaded control program. Further, such a control program may be stored in other electronic devices as well as the display apparatus 100.

The control program may include a program(s) embodied by at least one among a basic input/output system (BIOS), a device driver, an operating system, firmware, a platform, and an application program (or an application). According to an embodiment, the application program may be previously installed or stored in the display apparatus 100 when the display apparatus 100 is manufactured, or may be installed in the display apparatus 100 based on data of an application program received from the outside in the future when it is required to be used. The data of the application program may for example be downloaded from an external server such as an application market to the display apparatus 100, but not limited thereto. Meanwhile, the processor 104 may be embodied in the form of a device, a S/W module, a circuit, a chip, etc. or combination thereof.

The processor 102 may for example control the user input unit 101 to receive a user input. The processor 102 may further perform a process of an image and then control the display 103 to display the processed image. The display apparatus 100 shown in FIG. 2 is embodied to include one processor 102 configured to perform both the process and the control, but this is merely an example. According to an alternative embodiment of the disclosure, the display apparatus 100 may be embodied to additionally include a controller separately from the processor.

When a user's voice is input to the user input unit 101, the processor 102 processes the received voice signal. The process and recognition of the voice signal may for example be performed by dynamic time warping (DTW)-based voice recognition technology, hidden Markov model (HMM)-based voice recognition technology, rule-based approach-based voice recognition technology, deep learning-based voice recognition technology using deep natural network (DNN), etc.

The processor 102 may make the received voice signal be transmitted to and processed by a voice recognition server. The voice recognition server may for example be embodied by a speech-to-text (STT) server. When the voice recognition server is embodied by the STT server, the voice recognition server may be a server that carries out only the functions of the STT server, or may be a server that carries out other functions in addition to the functions of the STT server.

The voice signal transmitted to the voice recognition server is converted into data of a voice command (for example, a text corresponding to the voice signal) by the process of the server. The data of the voice command processed in the voice recognition server may be returned to the processor 102 or may be transmitted to another server.

The processor 102 may use the data obtained by autonomously processing the received voice signal or the data of the voice command processed in the voice recognition server to thereby perform a corresponding function. While performing the function corresponding to the data obtained by processing the voice signal, the processor 102 may use the voice recognition server or another server. For example, the processor 102 may make a text corresponding to the voice signal received in the STT server be transmitted to and processed in the STT server or another server, and then carry out a specific function based on the data processed and transmitted by the corresponding server.

The processor 102 may transmit information about the functions of the display apparatus 100, which correspond to the text converted from the voice signal, to the voice recognition server or another server. Therefore, the voice recognition server or another server may store the information about the functions corresponding to voice recognition results in the storage, and provide the information to the display apparatus 100 so that the corresponding functions can be carried out with reference to the stored information when the same voice command is received.

The display 103 may display an image processed in the processor 102. The display 10 may for example be embodied by various display types such as liquid crystal, plasma, a light emitting diode (LED), an organic light emitting diode (OLED), a surface-conduction electron-emitter, a carbon nano-tube, nano-crystal, etc. without limitations. When the type of the display 101 is the liquid crystal, the display may include a liquid crystal display (LCD) panel, a backlight unit for emitting light to the LCD panel, a panel driver for driving the LCD panel, etc. The display 103 may be embodied by a self-emissive OLED panel without the backlight unit.

Figure 3:
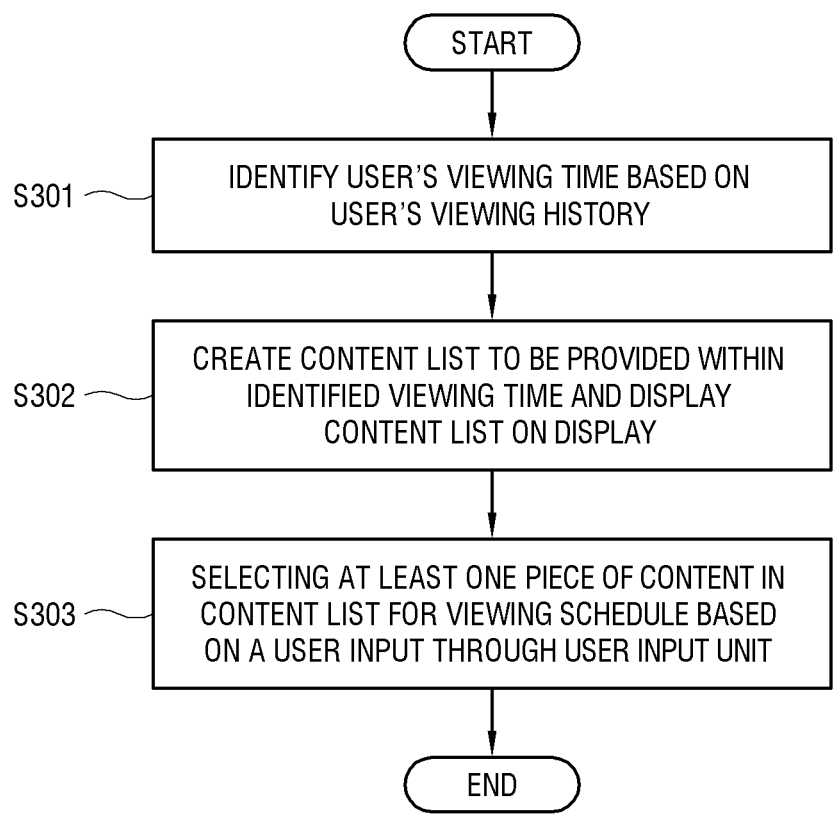
FIG. 3 is a flowchart of showing operations of a display apparatus according to an embodiment of the disclosure.

FIG. 3 is a flowchart of showing operations of the display apparatus 100 according to an embodiment of the disclosure.

The processor 102 of the display apparatus 100 according to an embodiment of the disclosure identifies a user's viewing time based on the user's viewing history (S301). Here, content involves various pieces of information provided through the display apparatus 100, and may for example include image content, music content, etc. Besides, there are no limits to the materials or types of the content. Further, a user's 'viewing time' refers to a total time during which the user wants to view content through the display apparatus 100 or time about how long the user who starts using the display apparatus 100 by turning it on or the like method will view the content through the display apparatus 100. For example, a user's 'viewing time' may mean time expected to be taken from time when the user turns on and starts using the display apparatus 100 to time when the user stops using the display apparatus 100. The viewing time may be identified based on a preset value, may be identified based on a value input by a user, or may be identified with reference to a user's viewing history or a user's history of using the display apparatus 100 like the operation S301. Details will be described below in the following relevant section. For convenience of description, it will be described on the assumption that the viewing time is identified based on a user's viewing history.

The processor 102 creates a list of content to be provided within the viewing time identified based on the viewing history, and displays the content list on the display 103 (S302). For example, when a user's viewing time is identified as one hour, the processor 102 may create a list of first content, second content and third content as the list of content viewable within one hour. Below, such a content list will be called a 'plan'. Details of the content list or plan will be described below with reference to FIG. 4.

The processor 102 selects at least one piece of content from the content list based on a user input through the user input unit 101, and schedules viewing (S303). However, the viewing is not necessarily scheduled based on a user input, but may be scheduled based on occurrence of a predetermined event or the like without a user's command input.

Figure 4:
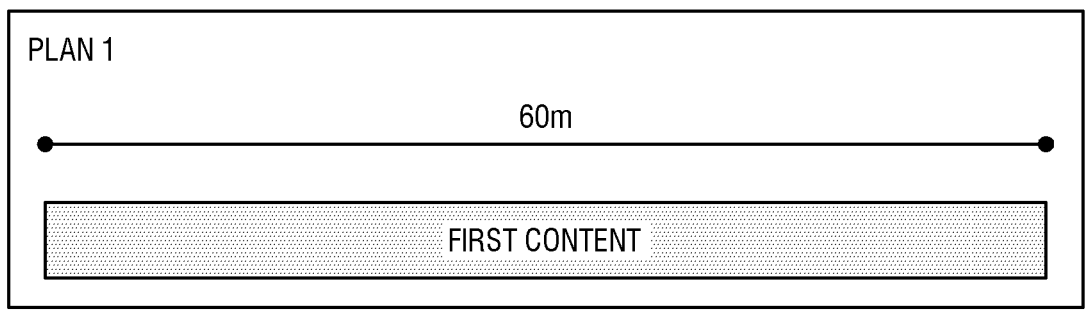
FIGS. 4, 5, and 6 show examples of a content list.
Figure 5:
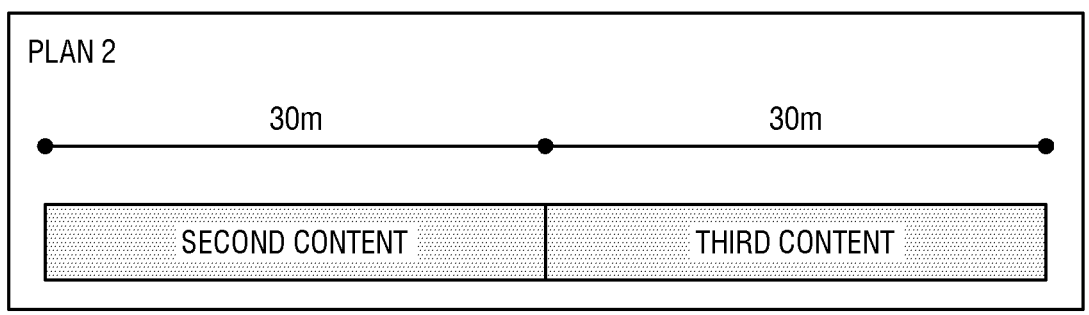
Figure 6:
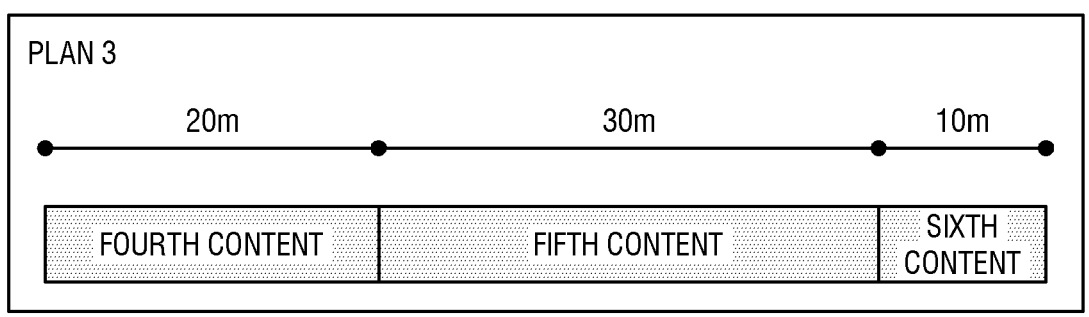

FIGS. 4 to 6 show examples of a content list or plan. For convenience of description, it will be described by way of example that a user's viewing time is identified as one hour. In this case, the number of cases where content to be provided during the identified viewing time of one hour 1 is listed may be varied depending on the number of pieces, kinds, materials, length, etc. of content to be provided. For example, the content list may include only the first content, which has a playback time of 60 minutes as shown in FIG. 4, may include the second content and the third content, each of which has a playback time of 30 minutes as shown in FIG. 5, or may include fourth content, fifth content and sixth content which respectively have different playback times of 20, 30 and 10 minutes. However, the content lists given in FIGS. 4 to 6 are merely examples, and the content list according to the disclosure is not limited to these examples.

The processor 102 of the display apparatus 100 according to an embodiment of the disclosure creates a content list that suits a user's tastes, preferences, etc. as one among various lists of content viewable during the identified viewing time (for example, one hour) as described above, and then shows the content list to a user. In other words, the processor 102 recommends the content list to a user. Details about a method of recommending the content list will be described below in a related section.

Figure 7:
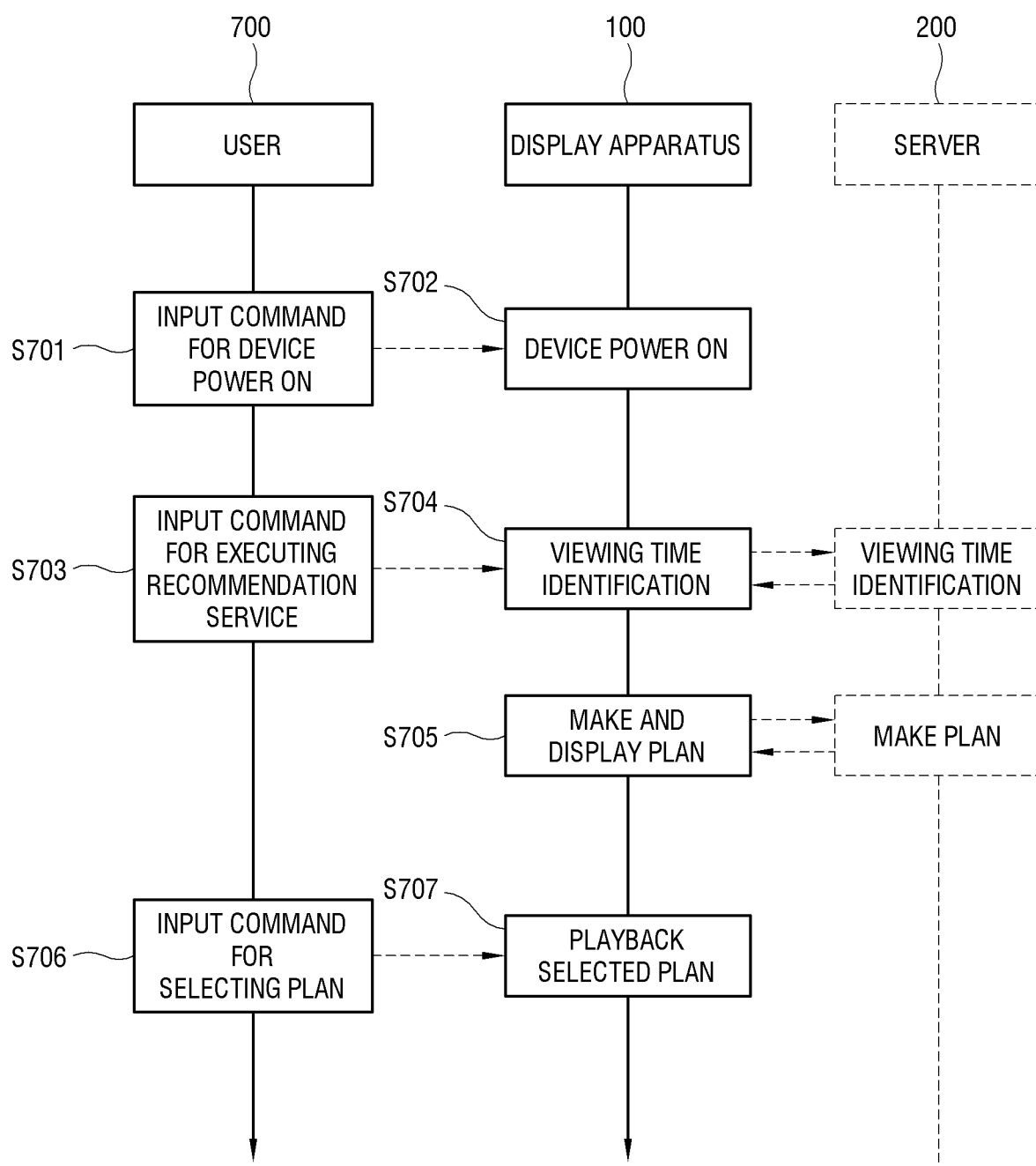
FIG. 7 shows an example of a relationship between a user input and operations of a display apparatus according to an embodiment of the disclosure.

FIG. 7 shows an example of a relationship between a user input and operations of the display apparatus 100 according to an embodiment of the disclosure.

A user 700 may issue a command to turn on the display apparatus 100 according to an embodiment of the disclosure (S701), and thus the processor 102 of the display apparatus 100 executes a control command needed for turning on the display apparatus 100 to thereby perform an operation of turning on the display apparatus 100 (S702).

Then, when a user issues a command to make a request for a service related to the content recommendation (S703), the display apparatus 100 identifies the user's viewing time based on the user's viewing history in response to the command (S704), and generates and displays the list of content, which will be provided during the viewing time identified based on the viewing history, on the display 103 (S705). A detailed method by which the processor 102 creates the content list will be described later.

Then, when a user issues a command to select the content list displayed on the display 103 (S706), the processor 102 of the display apparatus selects at least one piece of content in the selected content list and schedules viewing the selected content (S707).

Meanwhile, the foregoing example shows that the processor 102 performs the operation S704 of identifying a user's viewing time and the operation S707 of selecting at least one piece of content in the selected content list and scheduling viewing the selected content in response to the command issued by a user. However, the operations according to an embodiment of the disclosure is not limited to this example, but may for example be performed based on occurrence of a predetermined event even though there are no commands issued by a user. For example, the operations may be carried out by a control command of the processor 102 based on execution of a predetermined program, a lapse of a predetermined period of time, or the like event.

Further, the foregoing embodiment describes that the operation S704 of identifying a user's viewing time based on the user's viewing history and the operation S705 of creating the list of content to be provided within the viewing time identified based on the viewing history are performed by the processor 102 in the display apparatus 100. However, the foregoing operations according to an embodiment of the disclosure are not limited to this embodiment, but may be performed by a separate server 200. Below, for convenience of description, it will be described on the assumption that the foregoing operations are performed in the display apparatus 100.

Figure 8:
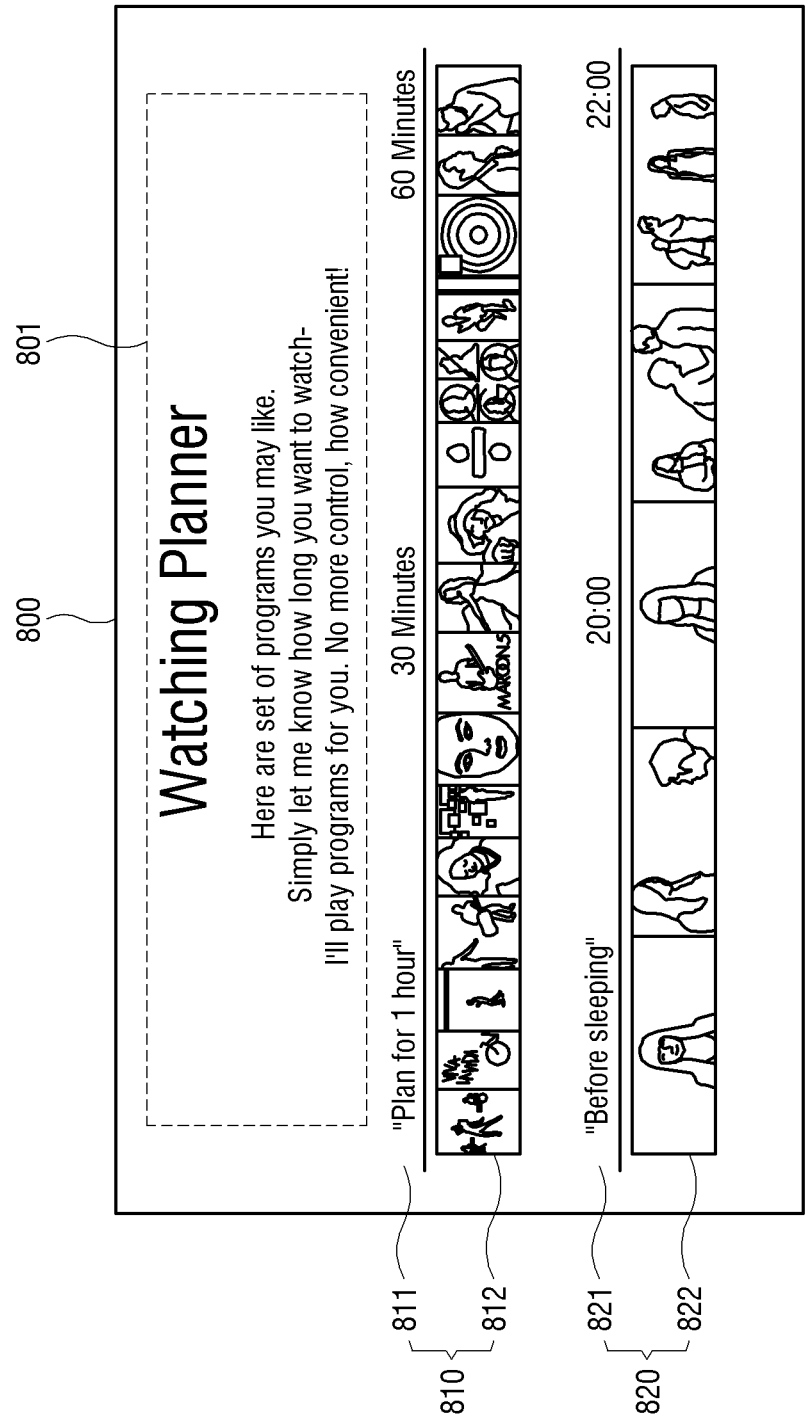
FIG. 8 illustrates a method of identifying viewing time and a method of displaying a content list based on the viewing time in a processor according to an embodiment of the disclosure.

FIG. 8 illustrates a method of identifying viewing time and a method of displaying a content list based on the viewing time in the processor 102 according to an embodiment of the disclosure.

The operations of the processor 102 according to an embodiment of the disclosure may be provided in the form of an application running in the display apparatus 100. FIG. 8 shows an example of a user interface (UI) 800 of a corresponding application in this case. The UI 800 of the application may include an item 801 showing that the corresponding application is an application of providing a content list a user would like to watch, i.e. providing a 'watching plan'.

Further, the UI 800 of the application may include items 810 and 820 of showing the list of content to be providable within the identified viewing time. In this case, the UI 800 of the application may display only one content list, or may display a plurality of content lists 810 and 820 to be selectable as shown in FIG. 8.

The items 810 and 820 displaying the content lists may include items 811 and 821 showing information related to the identified viewing time, and items 812 and 822 showing the list's own materials of the content to be provided within the identified viewing time.

There may be various methods by which the processor 102 of the display apparatus according to an embodiment of the disclosure identifies a user's viewing time. For example, the processor 102 may identify a user's viewing time based on a preset value. For example, the processor 102 may identify a preset time such as one hour, two hours, etc. from the current time as a user's viewing time. In FIG. 8, "Plan for 1 hour" 811 is shown as an example of the UI corresponding to identification of the viewing time, and this means that the processor 102 identifies a user's viewing time as one hour. Along with this, the processor 102 may display the content list identified based on the viewing time (S812).

As another example of identifying a user's viewing time, the processor 102 may identify the viewing time based on a user's viewing history. For example, the processor 102 may calculate average use time or content viewing time according to hours at which a user uses the display apparatus 100 or hours from which the user starts watching content, based on the user's viewing history, and identify the user's viewing time with reference to this. In FIG. 8, "Before Sleeping" 821 is shown as an example of the UI corresponding to identification of the viewing time. For example, when a user executes a corresponding application at 18:00, the processor 102 may identify that a viewer using the display apparatus at 18:00 has used the display apparatus usually up to 22:00 based on the user's viewing history, and thus identifies 4 hours as the viewing time. Further, the processor 102 may found a pattern that the user keeps watching until s/he falls asleep, name the pattern "Before Sleeping" 821, and display the name. With this, the processor 102 may also display the content list created based on the identified viewing time (S822).

Meanwhile, the foregoing example shows that the viewing time is identified based on a preset value or a user's viewing history, but an embodiment of the disclosure is not limited to this example. For example, the processor 102 may receive information about a predetermined time through the user input unit 101, and identify a user's viewing time based on the received information.

Figure 9:
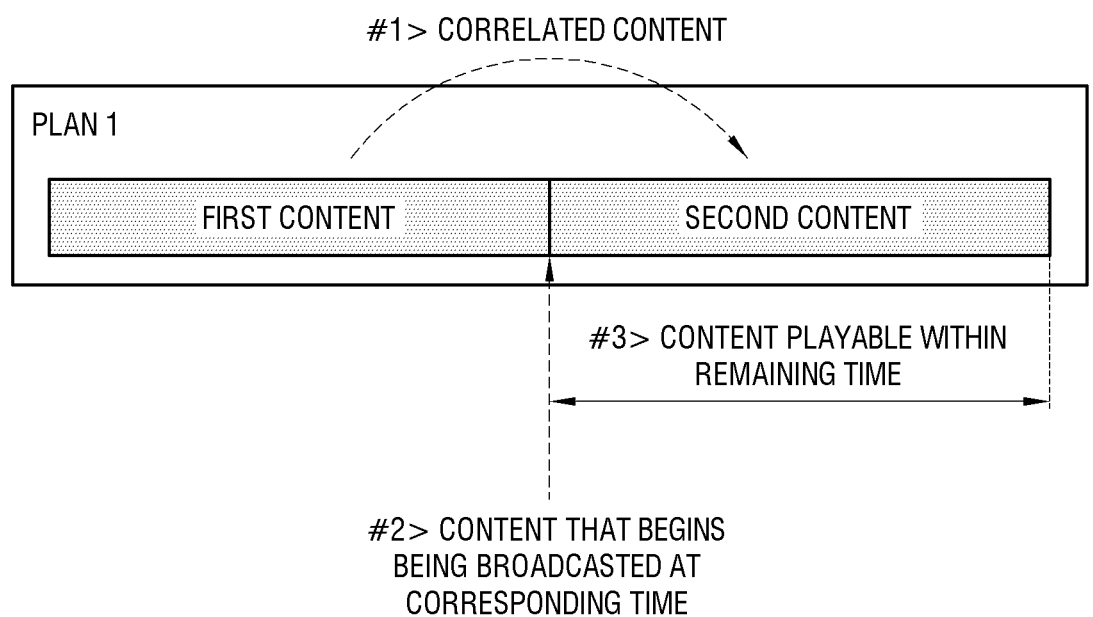
FIG. 9 illustrates a method of creating a content list in a processor according to an embodiment of the disclosure.

FIG. 9 illustrates a method of creating a content list in the processor 102 according to an embodiment of the disclosure.

As an example of creating the content list, the processor 102 of the display apparatus according to an embodiment of the disclosure may create the content list by a method of identifying the first content and then identifying the second content based on at least one of a correlation with the first content, a playback end time of the first content, or a remaining viewing time. Specifically, the processor 102 may preferentially identify the first content. In this case, there are various methods of identifying the first content. For example, the processor 102 may identify the first content with reference to a user's viewing history based on the current time. Then, the processor 102 may identify the second content. Likewise, there are various methods of identifying the second content. For example, the processor 102 may identify the second content based on a correlation with the first content (see #1 in FIG. 9). Alternatively, the processor 102 may calculate time at which the playback of the first content is ended, and identify the second content among pieces of content that begins being broadcasted at the corresponding time (see #2 in FIG. 9). Alternatively, the processor 102 may identify content, which is playalbe within a remaining time obtained by subtracting the playback time of the first content from the user's viewing time, in other words, the remaining viewing time, as the second content (see #3 in FIG. 9).

Although the foregoing example shows that the content list including two pieces of content within the identified viewing time is created, the disclosure is not limited to this example. The content list including more than two, for example, three pieces of content may be created. In this case, in terms of identifying the third content, the processor 102 may for example identify the first content and the second content, and then identify the third content by one of the methods shown in FIG. 9.

Further, the foregoing method shows that pieces of content to be included in the content list are identified in order, but an embodiment of the disclosure is not limited to this method. The processor 102 may identify the pieces of content simultaneously or independently. In this case, there may be additionally needed an operation of identifying whether a total playback time of the identified pieces of content exceeds the user's viewing time.

In terms of identifying each piece of content, the processor 102 may use an algorithm related to the content recommendation. For example, the processor 102 may employ a collaborative filtering algorithm, a content-based filtering algorithm, a model-based collaborative filtering algorithm, a latent model-based algorithm, a deep learning-based algorithm, etc. to identify the content.

Thus, the display apparatus according to an embodiment of the disclosure may not only recommend content in consideration of a user's viewing time slot, but also recommend a content list in consideration of an estimated total viewing time, thereby simply recommending a plurality of pieces of content and furthermore recommending a well-organized viewing plan itself to the user. Therefore, convenience of a user is improved because the user can successively view desired pieces of content according to the viewing plan without separately controlling the display apparatus.

FIGS. 10 to 17 illustrate a method of displaying a content list according to an embodiment of the disclosure.

Figure 10:
FIGS. 10, 11, 12, 13, 14, 15, 16, and 17 illustrate a method of displaying a content list according to an embodiment of the disclosure.
Figure 11:
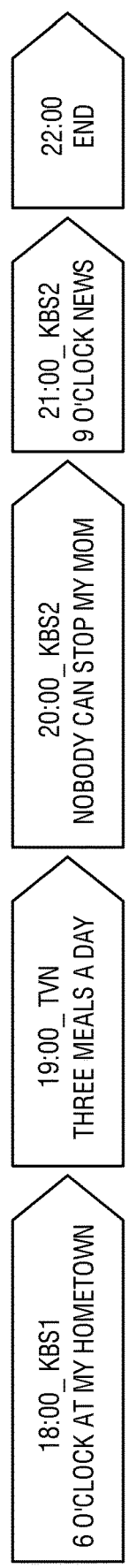
Figure 12:
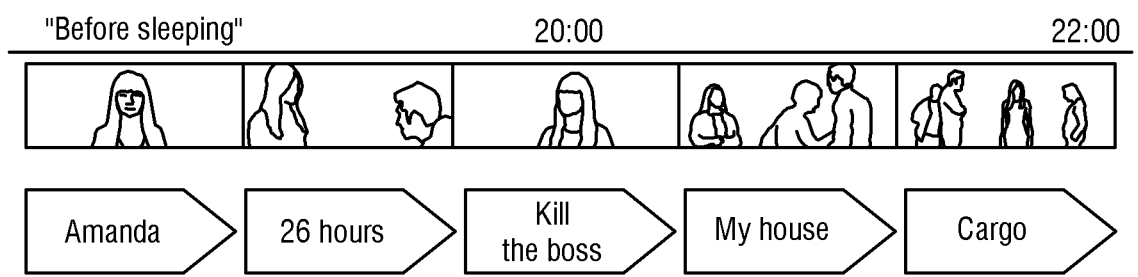

There are various methods by which processor 102 displays the content list on the display 103. For example, as shown in FIG. 10, the processor 102 may display 'image' information corresponding to pieces of content included in the content list in order of pieces of content that constitutes the content list, and display a related playback time together with the pieces of image information. Further, as shown in FIG. 11, the processor 102 may display 'text' information corresponding to pieces of content included in the content list. Further, as shown in FIG. 12, the processor 102 may display both the image information and the text information corresponding to pieces of content.

Figure 13:
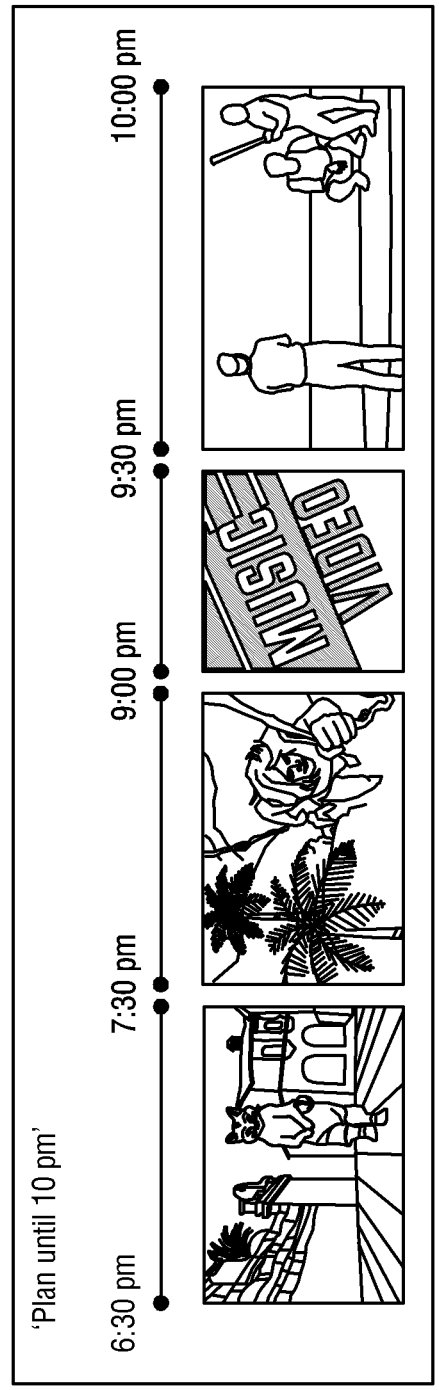
Figure 14:
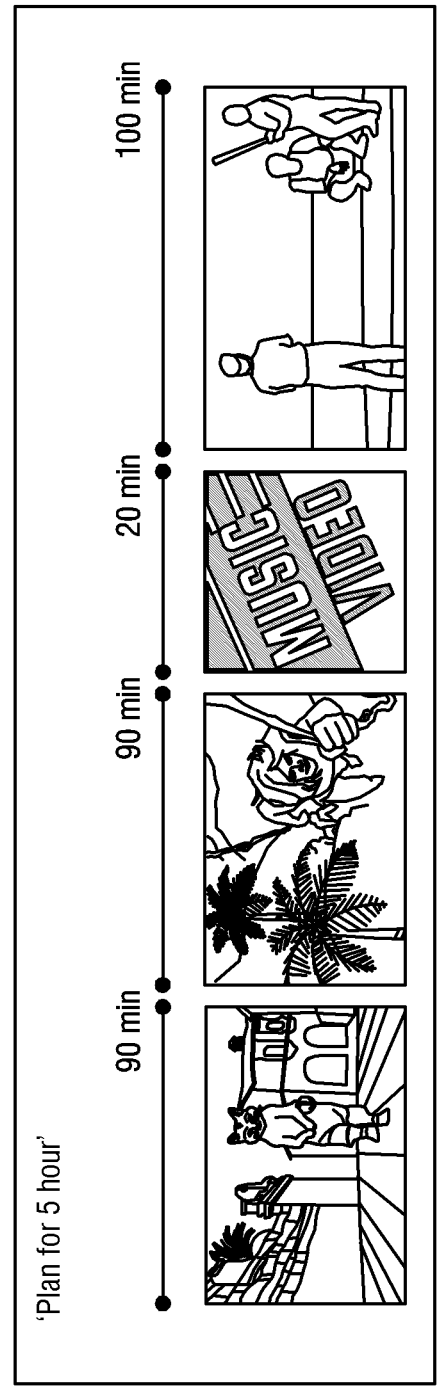
Figure 15:
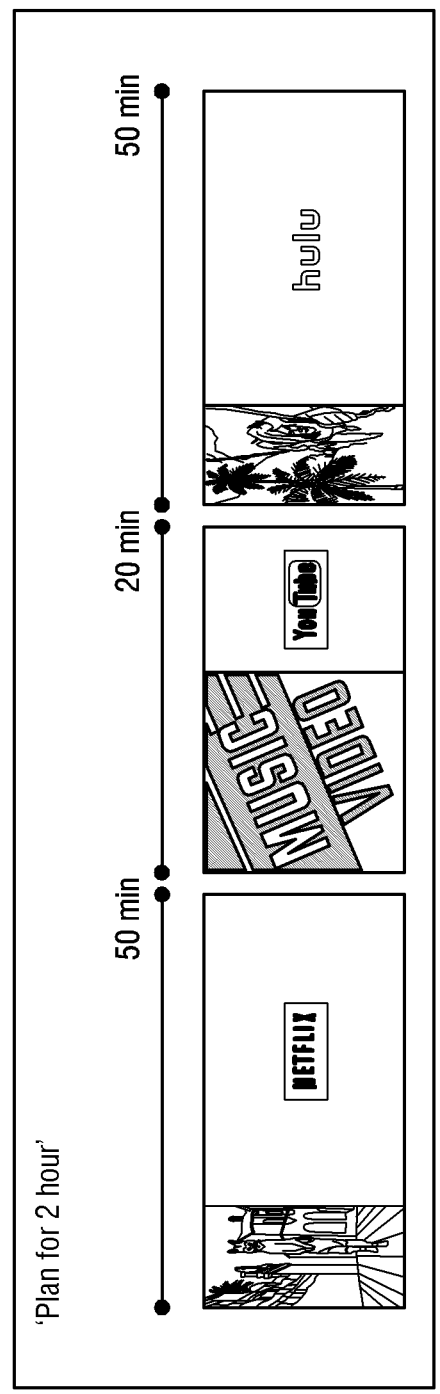
Figure 16:
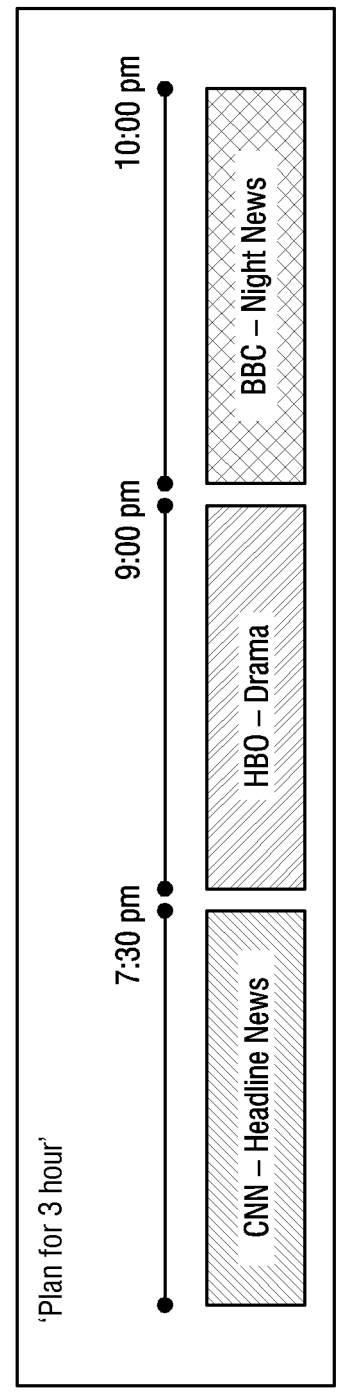
Figure 17:
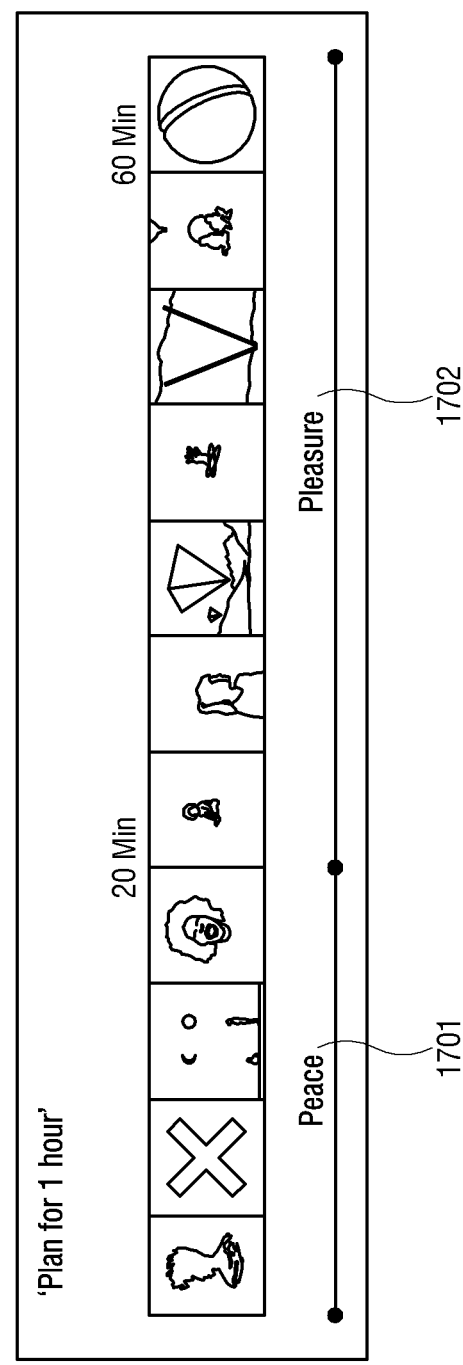

Meanwhile, as shown in FIG. 13, the processor 102 may further display start time and end time of each content playback in addition to the foregoing information about the pieces of content included in the content list. Further, as shown in FIG. 14, the processor 102 may display the length of each piece of content or time required in the playback. Further, as shown in FIG. 15, the processor 102 may display information about a content provider along with the content information. Further, as shown in FIG. 16, the processor 102 may display the content information with colors, patterns, designs, etc. different according to channels of providing the content or genres of the content. Further, as shown in FIG. 17, the processor 102 may display meta information about content together with the image information corresponding to the content. As an example of the meta information, FIG. 17 shows mood information 1701 and 1702 about music in a case of music content.

Meanwhile, the processor 102 of the display apparatus 100 according to an embodiment of the disclosure may create a content list by replacing some pieces of content with another piece of content in response to a user input making a request for changing some pieces of content in the displayed content list. This will be described with reference to FIG. 18.

Figure 18:
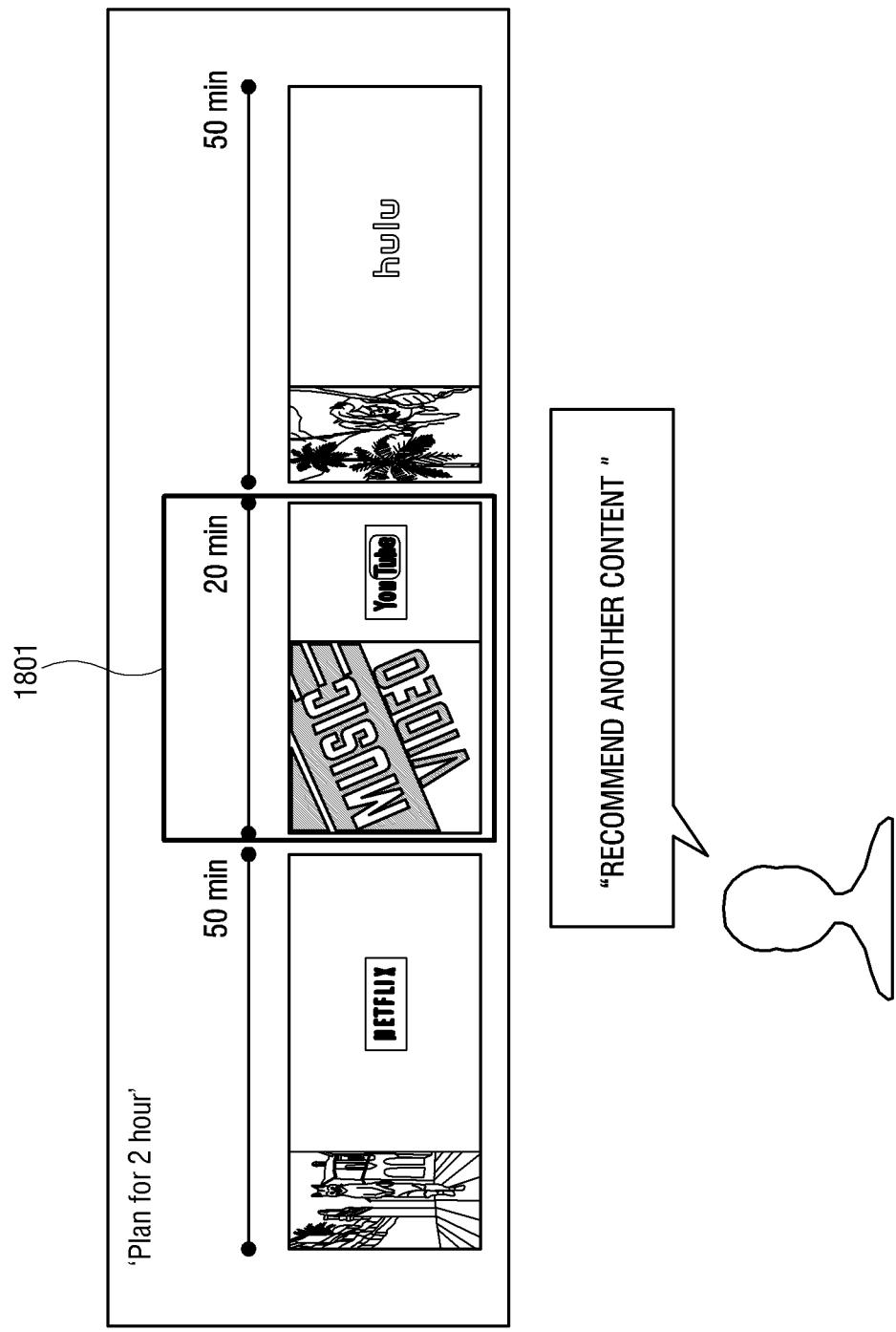
FIG. 18 illustrates an operation of a display apparatus according to another embodiment of the disclosure.

FIG. 18 illustrates a case where the processor 102 identifies a user's viewing time of two hours and thus identifies and displays pieces of content respectively having playback times of 50 minutes, 20 minutes and 50 minutes as a list of content to be provided within two hours on the display 103.

The user checks the displayed content list and issues a user command to replace some pieces of content in the displayed content list with other pieces of content. For example, a user may select one piece of content 1801 among the displayed pieces of content by a touch input, a remote-control input, etc. and then inputs a voice command of "recommend another content". In this case, the processor 102 may display another piece of content instead of the selected piece of content 1801 in response to such a user input.

FIG. 18 shows an example that some pieces of content are replaced with other pieces of content while only one content list is being displayed, but an embodiment of the disclosure is not limited to this example. Alternatively, for example, the processor 102 may display a plurality of content lists on one screen, and a user may input a command to replace some pieces of content in one of the content lists with some pieces of content in another content list, thereby allowing the processor 102 to perform a process based on the input.

Meanwhile, the foregoing example describes that the processor 102 of the display apparatus 100 according to an embodiment of the disclosure autonomously identifies a content list to be created, but an embodiment of the disclosure is not limited to this example. For example, the processor 102 may create a content list based on a condition input by a user through the user input unit 101. This will be described with reference to FIGS. 19 to 20.

Specifically, the processor 102 may receive information about a condition to be referenced when making a content list from a user, and creates a content list based on the received information. The information about the condition to be referenced when creating the content list may include a genre of content, the maximum or minimum length of a playback time of a content, etc., but not limited thereto. Alternatively, the information may include any kinds of information about the content.

Figure 19:
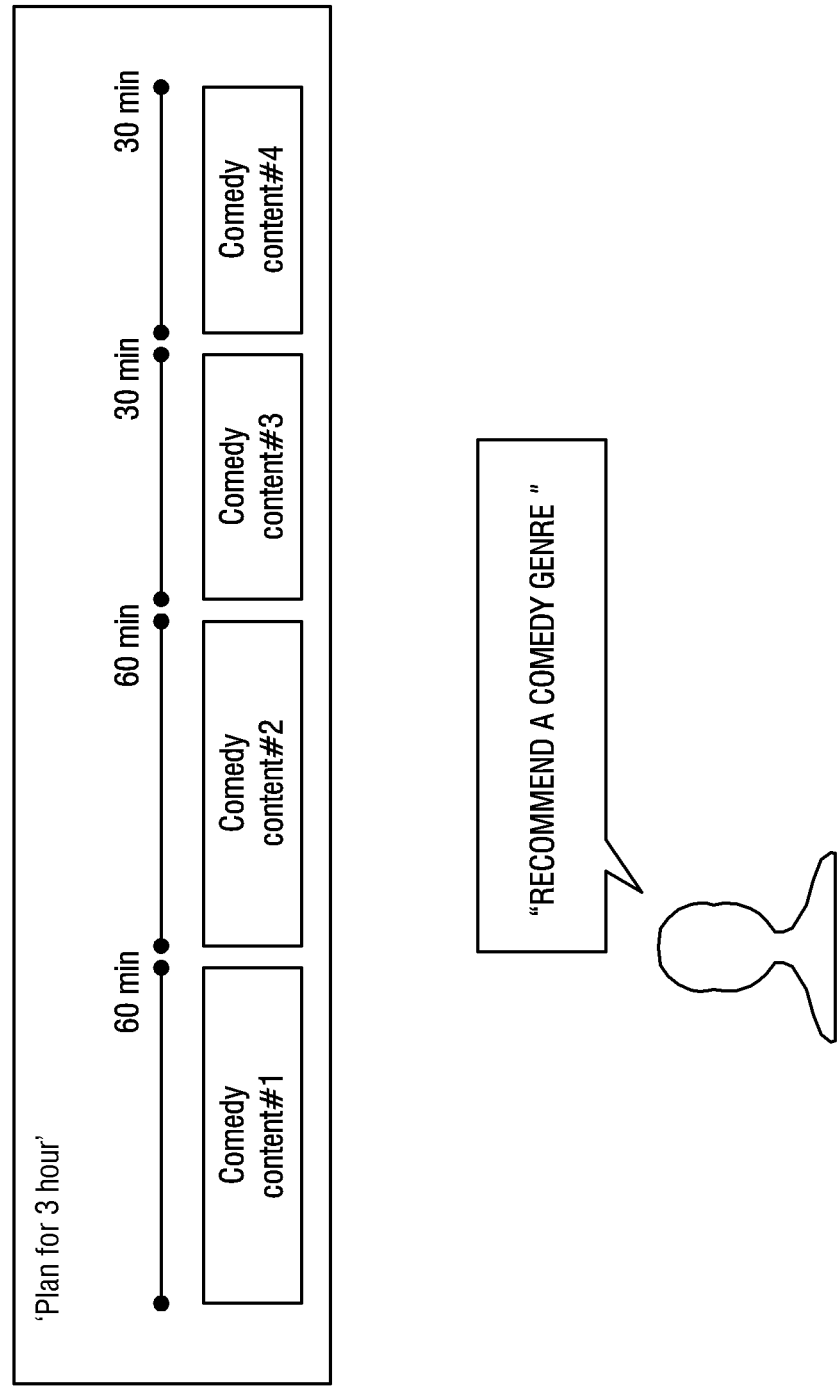

For example, as shown in FIG. 19, when a user inputs a voice command of "recommend a comedy genre", the processor 102 may create a list of content corresponding to only the comedy genre when making the content list, based on the voice command input.

Alternatively, as shown in FIG. 20, when a user input a voice command of "recommend a highlight version of a comedy genre", the processor 102 may create a final list of content with highlight images of comedy genre content when making the content list, based on the voice command input, and display the content lint on the display 103. In this case, highlight images of specific content may be created by deep learning-based automatic video summary generation or the like.

Further, when a user previously selects one piece of content and makes a request for creating a content list including the selected content, the processor 102 may create the content list by a method of preferentially selecting content highly related to the selected content based on information about the selected content, for example, the user's viewing history.

Thus, it is possible to provide a content list that better suits a user's intention.

Figure 21:
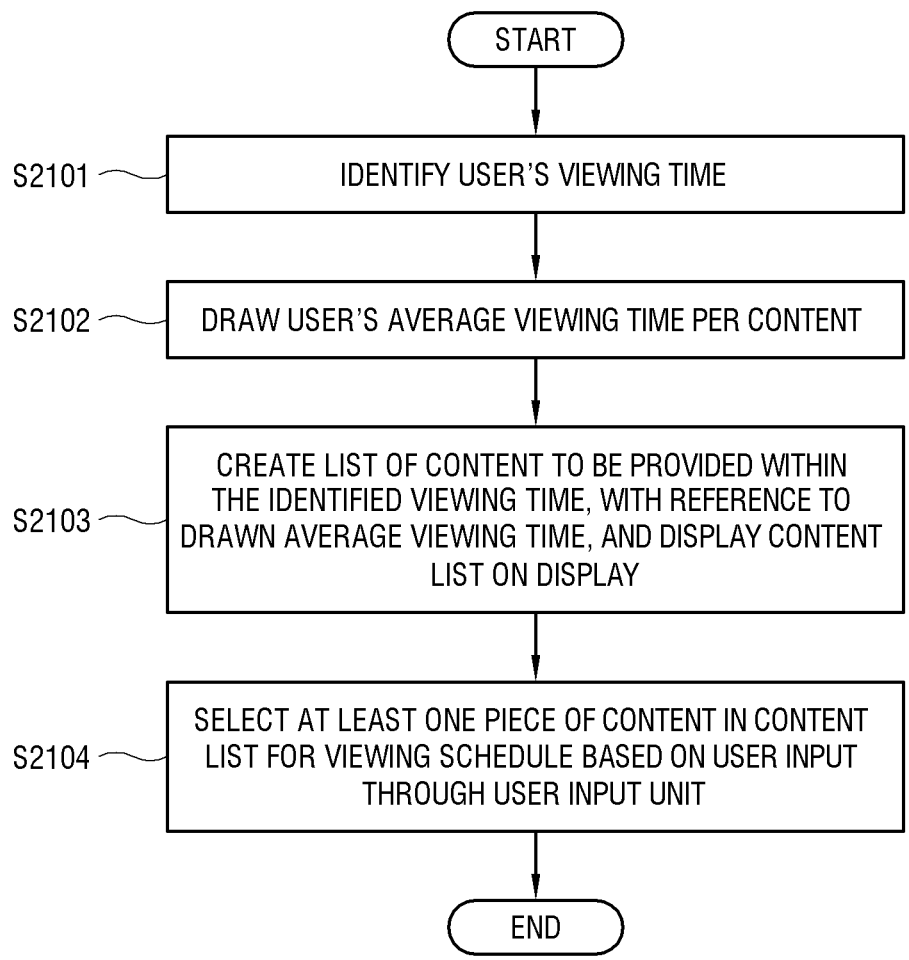
FIG. 21 illustrates operations of a display apparatus according to still another embodiment of the disclosure.

Meanwhile, the processor 102 the display apparatus 100 according to an embodiment of the disclosure may draw a user's average viewing time per content from the user's viewing history, and generate a content list based on the drawn average viewing time. This will be described with reference to FIG. 21.

The processor 102 the display apparatus 100 according to an embodiment of the disclosure identifies a user's viewing time (S2101), and then draws the user's average viewing time per content based on the user's viewing history or the like (S2102). Then, the processor 102 creates a list of content to be provided within the identified viewing time, with reference to the drawn average viewing time, and displays the content list on the display (S2103). In other words, the processor 102 according to this embodiment further takes a user's average content viewing time about one piece of content into account when making a content list, thereby creating and displaying the content list that better suits a user's characteristics. Thus, a content list that better suits a user's content viewing habit is provided, thereby contributing maintenance of a user's concentration when viewing the content.

Meanwhile, the processor 102 of the display apparatus 100 according to an embodiment of the disclosure may draw an actual playback time by subtracting a playback time of appended information from a content playback time when making a content list, and creates the content list based on the drawn actual playback time. Here, the appended information refers to information related to content but not corresponding to the content itself, which may for example include advertisement and the like about goods or service related to the content or advertisement about service. When the corresponding content is not broadcasting content or the like that is broadcasted live, a user can watch the content by skipping a playback part of the appended information when the corresponding content is played back. In this case, there may be a difference between content's own total playback time and time for which a user watches the content in person. To solve this, the processor 102 according to an embodiment calculates the playback time of the appended information based on information or the like corresponding to, for example, the appended information in the content when making the content list, and then draws the actual playback time by subtracting the playback time of the appended information from the content playback time, thereby creating the content list based on the drawn actual playback time. Thus, it is possible to provide a content list that better suits a user's actual content playback time.

Meanwhile, when the display apparatus 100 is shared among a plurality of users as shown in FIG. 22, the processor 102 of the display apparatus 100 according to an embodiment of the disclosure detects the plurality of users employing the display apparatus 100, and creates a content list based on information about the plurality of detected users.

For example, the processor 102 in this embodiment is capable of detecting the plurality of users who are using the display apparatus 100. There are various methods by which the processor 102 detects the plurality of users, and there are various degrees of identification based on the detection. For example, the processor 102 may identify only the number of users or motion through a Wi-Fi signal, proximity sensor, thermal sensor, etc. Alternatively, the processor 102 may identify a user's gender, age group, etc. through a home camera or the like. Alternatively, the processor 102 may identify personal identification information of each individual of the plurality of users through biometrics, a personal device, etc. In each case, the processor 102 may further take the identified information into account to create the content list. For example, when only the number of users or motion is identifiable, the processor 102 may preferentially identify content well-evaluated by many users, and put content, of which evaluation widely varies between users, to a lower priority. Alternatively, when the processor 102 is capable of identifying a user's gender, age group, etc., the processor 102 may create a content list by preferentially selecting content that suits users' identified gender and age group. Alternatively, when the processor 102 is capable of identifying information about individual users, the processor 102 may analyze each individual user's viewing history, and preferentially selects content preferred in common.

Further, the processor 102 not only uses identification information about a plurality of users to create a content list, but also stores the identification information about the plurality of users who watched content in addition to the information about the viewing history of the content, so that the viewing history information of the content including the user information can be referenced when making the content list in the future based on whether the plurality of users are present or not and a degree of identifying the users. In this case, the processor 102 may for example create a content list based on whether preference of some users among a plurality of users is more reflected in viewing, etc. when the display apparatus 100 is shared among the plurality of users. For example, when a viewing history of content such as the first content, the second content and the third content is stored, and information that users A, B and C viewed the corresponding content is also stored together with the viewing history, the processor 102 may analyze the history information and the viewing history information about the users and identify that the history of content viewed by the users A, B and C highly suites the viewing history of, for example, the user A among three users. In this case, when it is identified that the users A, B and C are using the display apparatus 100 together based on identification of users, the processor 102 may create a content list by preferentially referring to the viewing history of the user A. Thus, the content list is more improved in reliability.

According to the disclosure, content is recommended in consideration of a user's viewing time slot, and a content list is recommended in consideration of a user's an estimated total viewing time, thereby simply recommending a plurality of pieces of content and furthermore recommending a well-organized viewing plan itself to the user. Therefore, convenience of a user is improved because the user can successively view desired pieces of content according to the viewing plan without separately controlling the display apparatus.

According to the disclosure, it is possible to provide a content list that better suits a user's intention.

According to the disclosure, a content list that better suits a user's content viewing habit is provided, thereby contributing maintenance of a user's concentration when viewing the content.

According to the disclosure, a content list is more improved in reliability.

According to the disclosure, a content list that better suits a user's actual content playback time is provided.

According to the disclosure, content is recommended in consideration of a user's viewing time slot, and a content list is recommended in consideration of a user's an estimated total viewing time, thereby simply recommending a plurality of pieces of content and furthermore recommending a well-organized viewing plan itself to the user. Therefore, convenience of a user is improved because the user can successively view desired pieces of content according to the viewing plan without separately controlling the display apparatus.

According to the disclosure, it is possible to provide a content list that better suits a user's intention.

According to the disclosure, a content list that better suits a user's content viewing habit is provided, thereby contributing maintenance of a user's concentration when viewing the content.

According to the disclosure, a content list is more improved in reliability.

According to the disclosure, a content list that better suits a user's actual content playback time is provided.

What is claimed is:

1. A display apparatus comprising:
a display; and
a processor configured to:
collect a viewing history of a user,
determine a viewing time of the user corresponding to a time duration in which the user is expected to view contents using the display apparatus based on the user's collected viewing history,
identify a first content and a second content to be provided within the determined viewing time, wherein the first content and the second content are selected to reflect preferences of the user based on the collected viewing history, and wherein reproducing time of the first content and the second content corresponds to the time duration of the viewing time, and wherein the first content is firstly selected with reference to the user's viewing history based on a current time and then the second content is selected among contents that is broadcasted at time at which the playback of the first content is ended based on a correlation with the first content and remaining time excluding reproducing time of the first content in the time duration of the viewing time,
display a content list including the first content and the second content on the display, and
based on a user input to reproduce contents in the content list, successively reproduce the first content and the second content during the time duration of the viewing time.

2. The display apparatus according to claim 1, wherein the processor is configured to display a plurality of content lists to be selectable, and successively reproduce contents in the selected content list based on a user input to reproduce contents in the selected content list.

3. The display apparatus according to claim 1, wherein the processor is configured to display a content list by replacing at least one content with different content, based on a user input making a request for changing the displayed content list.

4. The display apparatus according to claim 1, wherein the processor is configured to create the content list including the first content and the second content based on a condition input to the display apparatus.

5. The display apparatus according to claim 1, wherein the processor is configured to identify an average viewing time per content of the user from the user's viewing history, and create the content list based on the identified average viewing time.

6. The display apparatus according to claim 1, wherein the processor is configured to detect a plurality of users using the display apparatus, and create the content list based on information about the plurality of detected users.

7. The display apparatus according to claim 1, wherein the processor is configured to identify an actual playback time by subtracting a playback time of appended information from a total content playback time, and create the content list based on the identified actual playback time.

8. A method of controlling a display apparatus, comprising:
- collecting a viewing history of a user;
- determining a viewing time of the user corresponding to a time duration in which the user is expected to view contents using the display apparatus based on the user's collected viewing history;
- identifying a first content and a second content to be provided within the determined viewing time, wherein the first content and the second content are selected to reflect preferences of the user based on the collected viewing history, and wherein reproducing time of the first content and the second content corresponds to the time duration of the viewing time, and wherein the first content is firstly selected with reference to the user's viewing history based on a current time and then the second content is selected among contents that is broadcasted at time at which the playback of the first content is ended based on a correlation with the first content and remaining time excluding reproducing time of the first content in the time duration of the viewing time,
- displaying a content list including the first content and the second content on the display; and
- based on a user input to reproduce contents in the content list, successively reproduce the first content and the second content during the time duration of the viewing time.

9. The method according to claim 8, further comprising displaying a plurality of content lists to be selectable, and successively reproducing contents in the selected content list based on a user input to reproduce contents of the selected content list.

10. The method according to claim 8, further comprising displaying a content list by replacing at least one content with different content, based on a user input making a request for changing the displayed content list.

11. The method according to claim 8, further comprising creating the content list based on an input condition.

12. A computer program stored in a non-transitory medium to carry out the method according to claim 8 as combined to a display apparatus.

13. A server comprising:
a processor configured to:
- collect a viewing history of a user,
- determine a viewing time of the user corresponding to a time duration in which the user is expected to view contents using the display apparatus based on the user's collected viewing history,
- identify a first content and a second content to be provided within the determined viewing time, wherein the first content and the second content are selected to reflect preferences of the user based on the collected viewing history, and wherein reproducing time of the first content and the second content corresponds to the time duration of the viewing time, and wherein the first content is firstly selected with reference to the user's viewing history based on a current time and then the second content is selected among contents that is broadcasted at time at which the playback of the first content is ended based on a correlation with the first content and remaining time excluding reproducing time of the first content in the time duration of the viewing time,
- transmit a content list including the first content and the second content to the display apparatus so that the first content and the second content to be successively reproduced by the display apparatus during the time duration of the viewing time based on a user input to reproduce contents in the content list.

* * * * *